United States Patent Office 2,861,098
Patented Nov. 18, 1958

2,861,098

PRODUCTION OF CARBOXYLIC ACID ESTERS

Richard A. Di Sanza, Grand Rapids, Mich., and Alex Hlynsky, Painesville, Ohio, assignors to Diamond Alkali Company, Cleveland, Ohio, a corporation of Delaware No Drawing. Application July 17, 1956
Serial No. 598,242

4 Claims. (Cl. 260—493)

This invention relates to the preparation of novel compositions of matter by reaction of a halogenated aliphatic compound with a potassium salt of an organic acid in the presence of a mutual solvent.

It has been found that a particularly useful esterified product especially, but not exclusively, useful as a plasticizer for resins is obtained when a halogenated aliphatic compound is reacted with a potassium salt of an organic acid in the presence of a mutual solvent. The halogenated aliphatic compound, desirably a halogenated paraffin, preferably comprises a low viscosity liquid chlorinated paraffin although the term "halogenated" is intended to refer to halogens in addition to chlorine, i. e., bromine, fluorine and iodine.

The halogenated paraffin generally may be an aliphatic substance comprising a halogenated compound having about 18 to 36 carbon atoms in a straight or branched chain, and typically a chlorinated paraffin wax which averages of the order of 24 carbon atoms. Such waxes prior to halogenation melt within the range of about 48°–68° C., suitably 51°–55° C.

The amount of chemically combined halogen, preferably chlorine, characterizing halogenated paraffins especially useful in accordance with this invention contemplates amounts within the range from about 35% to 45%, preferably 40% although in certain instances a chlorine content up to about 75%, especially 69%–71% by weight also is suitable.

The potassium salt of an organic acid may be a potassium salt of various organic acids or mixtures thereof. As used herein, the term "organic acid" is intended to refer to aliphatic acids, both saturated and unsaturated, including (1) saturated monocarboxylic acids such as formic, acetic, propionic, butyric, valeric, caproic, caprylic, capric, lauric, myristic, palmitic, stearic, arachidic, behenic, lignoceric, and the like, having the structure RCOOH or, more generally, $C_nH_{2n+1}COOH$; (2) saturated dicarboxylic acids such as oxalic acid, malonic acid, succinic acid, glutaric acid, and the like, having the general formula $C_nH_{2n}(COOH)_2$; (3) unsaturated monocarboxylic acids of the general formula $C_nH_{2n-1}COOH$ such as myristoleic, palmitoleic, oleic, linoleic, linolenic, elaeostearic, licanic, ricinoleic, erucic, acrylic, crotonic, vinyl acetic; and (4) unsaturated dicarboxylic acids of the formula $C_nH_{2n-2}(COOH)_2$ such as maleic and fumaric acid.

Surprisingly, it has been found that of the alkali metal salts, only potassium salts of organic acids are suitable for use in the practice of this invention. The reaction involved in the practice of this invention requires the use of a mutual solvent for the halogenated paraffin and the potassium salt of an organic acid. A suitable mutual solvent in accordance with the present invention comprises an alkoxy alcohol, notably an alkoxy lower aliphatic alcohol, i. e., an alkoxy alkanol such as an alkoxy methanol, alkoxy ethanol, alkoxy propanol, and the like. The alkoxy group may be a lower alkoxy group such as methoxy, ethoxy, propoxy, and the like. Examples of specific solvents particularly advantageous and comprising the preferred solvents for use in accordance with the present invention are 2-alkoxy ethanols, more particularly such as 2-methoxy ethanol, 2-ethoxy ethanol, the latter compound being the specifically preferred solvent.

Hence, it will be understood that in accordance with the preferred practice of the present invention, a halogenated paraffin, preferably a chlorinated paraffin, is reacted with a potassium salt of an organic acid such, e. g., as potassium acetate, in the presence of an alkoxy alkanol, notably a 2-alkoxy-ethanol, selected from the group consisting of 2-methoxy ethanol and 2-ethoxy ethanol, the latter being the specifically preferred solvent.

The reaction is carried out until the desired degree of esterification is achieved, a typically practicable and preferred reaction yielding an ester having about 0.5 ester group per molecule although further reaction also is advantageous in certain instances, for example to obtain 0.89 or more ester group per molecule.

When the reaction between the chlorinated paraffin and the potassium salt is complete, the mutual solvent may be removed from the ester by distillation or by washing with water. If distillation is used, it desirably is conducted under a reduced pressure of less than about 1 mm. mercury in order to keep the distillation temperature low and to prevent discoloration of the ester. The chlorinated paraffin ester is then filtered or washed to remove any retained inorganic salts.

If instead of distillation the reaction product is washed with water, e. g., a volume of water equal to the volume of the reaction solvent used, a chlorinated paraffin layer can be separated from an aqueous layer without difficulty. The aqueous layer contains the formed inorganic salt, the unreacted potassium salt and about 95% of the reaction solvent. When most of the solvent has been removed from the ester product, the chlorinated paraffin ester can be washed again for further purification.

Generally the reaction is facilitated by the use of heat, typically practicable temperatures ranging from about 100° to 130° C. although at times both higher and lower temperatures also may advantageously be employed, the upper temperature generally being limited by the boiling points of the solvent used; e. g., 2-ethoxy ethanol boils at 135° C. Reaction times generally are in the order of 1–2 hours.

With respect to proportions of reactants, it generally is desirable to employ at least a stoichiometric amount of the potassium salt of the organic acid to react with the halogenated co-reactant, i. e., a molar ratio of potassium salt:halogenated paraffin of at least about 1:1, although at times lesser amounts of the potassium advantageously may be used, e. g., 0.5 or 0.6 mol per 1.0 mol of chlorinated paraffin.

In order that those skilled in the art may more completely understand the present invention and the preferred methods by which the same may be carried into effect, the following specific examples are offered:

EXAMPLE 1

To demonstrate the use of a potassium salt of an organic acid in contrast with a sodium salt similar tests are made by combining 0.5 mol of a chlorinated paraffin containing 40% by weight chemically combined chlorine and, separately, 1.0 mol of sodium acetate and 1.0 mol of potassium acetate. In each instance 250 ml. of 2-ethoxy ethanol is used as the mutual solvent. After two hours heating at 130° C., there is obtained in the case of the sodium acetate a product containing 41.8% chlorine and 0.12 acetate group per molecule. On the other hand, using potassium acetate, not only is the ester product obtained more soluble in the mutual solvent, but the chlorine content is 37.3% and there are 0.61 acetate group per molecule, the latter figure being more than 4 times that obtained using sodium acetate.

EXAMPLE 2

An ester is formed by reacting 0.6 mol potassium acetate and a 1.0 mol chlorinated paraffin having the formula $C_{20}H_{36.2}Cl_{5.84}$ and a molecular weight of 484, containing 42.8% by weight chlorine in 350 ml. of 2-ethoxy ethanol. The ester product obtained has the formula $$C_{20}H_{36.2}Cl_{5.35}Ac_{0.49}$$

a molecular weight of 495, and a chlorine content of 38.3% by weight.

EXAMPLE 3

Part A

A low viscosity chlorinated paraffin is prepared by chlorinating eicosane, a straight chain 20 carbon hydrocarbon. Chlorination is carried out until the chemically combined chlorine content is 42.8%, thus giving a chlorinated paraffin having an empirical formula of $$C_{20}H_{36.16}Cl_{5.84}$$

and a molecular weight of 483.7.

Part B

Using the chlorinated paraffin of Part A, a series of experiments are conducted by reacting the chlorinated paraffin with potassium acetate in a molar ratio of 1:1 using various solvent combinations. The results of such experiments are as follows:

| Solvent | Reaction Temp. (° C.) | Duration of Reaction (Hrs.) | Percent $Cl_2$ in Product | Number of Ester Groups per Molecule |
|---|---|---|---|---|
| Dioxane | 100 | 6 | 41.8 | 0.11 |
| (50% Dioxane) (50% Isopropanol) | 85 | 7 | 41.7 | 0.12 |
| Glacial Acetic Acid | 120 | 6 | 44.0 | |
| (2-ethoxy ethanol) | 100 | 1 | 40.9 | 0.21 |

As the above data indicates, 2-ethoxy ethanol as a mutual solvent produces the best results, both the chlorinated paraffin and potassium acetate dissolving therein to form a clear, yellow solution. As the above data indicates further, better replacement of a chlorine by an ester group is obtained in one hour using 2-ethoxy ethanol as a solvent than in 6 to 7 hours with the other solvents.

EXAMPLE 4

Into a 1000 ml. 3-necked round bottom flask equipped with a stirrer, thermometer and reflux condenser is placed 227.0 gm. (0.5 mol) low viscosity liquid chlorinated paraffin, 50 gm. potassium acetate (0.5 mol) and 500 ml. ethyl Cellosolve (2-ethoxy ethanol). The resultant mixture is then heated to 40° C. at which temperature all solids are dissolved. The heating is continued and at 80° C. the solution becomes turbid and amber in color and a white precipitate is formed. The solution is heated to 100° C. for one hour.

The resultant mixture is filtered. One-half of the filtrate is vacuum distilled until the temperature of the liquid in the distillation pot is 110° C. at 190 mm. Hg. The liquid in the pot is then filtered, dissolved in 150 ml. of methylene chloride and washed with water. A partial emulsion is formed and 10 ml. of 10% sulfuric acid is added to break the emulsion into an aqueous layer and an ester layer. The ester layer is then washed twice with water and placed in a vacuum distillation apparatus and held at 4 mm. Hg until the temperature of the distillation pot liquid reaches 100° C. A nitrogen atmosphere is provided to prevent any oxidation of the product. The pot liquid is then cooled and filtered and comprises a clear amber colored liquid ester product.

EXAMPLE 5

Into a 1000 ml. round bottom flask equipped with a thermometer, stirrer, and reflux condenser is placed 256 gm. (0.53 mol) chlorinated paraffin, 56 gm. potassium acetate and 500 ml. of freshly distilled 2-ethoxy ethanol. The mixture is heated to 60° C. at which temperature all solids are in solution. Heating is continued to 100° C. at which temperature the solution becomes turbid, changing to a reddish color and a white solid begins to form. There is then added 56 gm. additional potassium acetate in 10 ml. of water. With stirring, this mixture is heated for 3 hours at 100°–110° C. and then for an additional hour at 120°–125° C.

The mixture thus obtained is filtered and the filtrate, plus the liquid obtained after washing the filter cake with 250 ml. methylene chloride, is placed in a vacuum distillation apparatus and the methylene chloride removed at atmospheric pressure. Distillation is continued until the pot temperature reaches 90° C. The material is then filtered. To the filtrate is added 250 ml. carbon tetrachloride and the thus-formed material distilled to remove the solvent. One-half of the filtrate is placed back in the distillation flask and all solvent removed to a temperature of 150° C. at 15 mm. Hg. The liquid remaining in the distillation flask is cooled, filtered and comprises product A.

The second half of the filtrate is dissolved in 100 ml. benzene, again is filtered, and the solid thus obtained is washed with 100 ml. di-ethyl ether. The ether and benzene are then combined and washed successively with 10% HCl, 10% sodium hydroxide and twice with water. The resultant ether-benzene-ester layer is placed in a distillation flask and all solvent removed at a temperature of 150° C. at 15 mm. mercury. The liquid remaining in the distillation flask is filtered and comprises product B.

EXAMPLE 6

Using esters prepared in accordance with this invention by reaction of potassium acetate and low viscosity chlorinated paraffin in 2-ethoxy ethanol in accordance with the general procedure of Example 2, a series of formulations are prepared wherein such esters comprise secondary plasticizers in combination with dioctyl phthalate. The formulations evaluated are set forth in the following table wherein the quantities expressed are parts by weight:

| Ingredient | A | B | C | D | E | F |
|---|---|---|---|---|---|---|
| Polyvinyl Chloride Resin | 100 | 100 | 100 | 100 | 100 | 100 |
| Dioctyl Phthalate | 35 | 35 | 30 | 30 | 35 | 35 |
| Ester #1 | 15 | | | | | |
| Ester #2 | | 15 | 20 | | | |
| Ester #3 | | | | 20 | | |
| Ester #4 | | | | | 15 | |
| Ester #5 | | | | | | 15 |
| Ferro 1820 [1] | 2 | 2 | 2 | 2 | 2 | 2 |
| Ferro 903 [2] | 1 | 1 | 1 | 1 | 1 | 1 |

[1] Ferro Chemical Corp.—(barium-cadmium-laurate stabilizer).
[2] Ferro Chemical Corp.—(metal free organic stabilizer).

The evaluation of the above formulations by milling indicates that esters formed in accordance with this invention are more compatible in the resin formulations than chlorinated paraffins per se. Ordinarily, about 10 parts of a chlorinated paraffin plasticizer per 100 parts of polyvinyl chloride resin represents the upper limit of compatibility before spewing occurs. However, with the above esters amounts as high as 20 parts plasticizer per 100 parts resin are readily compatible. The above compositions also indicate that esters having a chlorine content of about 37.8 to 39.8% by weight are preferred in this application.

It is to be understood that although the invention has been described with specific reference to particular embodiments thereof, it is not to be so limited, since changes and alterations therein may be made which are within

What is claimed is:

1. The method which includes the steps of heating a mixture of a chlorinated aliphatic hydrocarbon having from 18 to 36 carbon atoms and containing about 35% to 75% of chemically combined chlorine by weight, a potassium salt of a lower alkanoic acid, and a lower-alkoxy-lower-alkanol as a mutual solvent for said chlorinated hydrocarbon and said salt, and recovering the reaction product thus formed containing ester groups.

2. The method of claim 1 wherein said lower-alkoxy-lower-alkanol is selected from the group consisting of 2-ethoxy-ethanol, and 2-methoxy-ethanol.

3. The method of claim 2 wherein said chlorinated hydrocarbon is chlorinated paraffin wax containing 35% to 45% of chemically combined chlorine by weight.

4. The method of claim 3 wherein said potassium salt of a lower alkanoic acid is potassium acetate, and said mixture is heated to the boiling point of the lower-alkoxy-lower-alkanol selected from said group.

References Cited in the file of this patent

UNITED STATES PATENTS

| 1,459,971 | Carter et al. | June 26, 1923 |
| 2,049,207 | Lawson | July 28, 1936 |

FOREIGN PATENTS

| 29,963 of 1912 | Great Britain | Mar. 30, 1914 |

UNITED STATES PATENT OFFICE

CERTIFICATE OF CORRECTION

Patent No. 2,861,098                                November 18, 1958

Richard A. Di Sanza et al.

It is hereby certified that error appears in the printed specification of the above numbered patent requiring correction and that the said Letters Patent should read as corrected below.

Column 1, line 72, and column 2, line 1, for "Examplates" read -- Examples --.

Signed and sealed this 17th day of March 1959.

(SEAL)
Attest:
KARL H. AXLINE

Attesting Officer

ROBERT C. WATSON
Commissioner of Patents